(12) United States Patent  (10) Patent No.: US 8,973,432 B2
Kishino et al.  (45) Date of Patent: Mar. 10, 2015

(54) GEAR SHIFT SHOCK EVALUATION APPARATUS AND EVALUATION METHOD OF THE SAME

(75) Inventors: Mitsuhiro Kishino, Hadano (JP); Tsubura Aihara, Isehara (JP); Hiroshi Sugiyama, Fujisawa (JP)

(73) Assignees: JATCO Ltd, Fuji-shi (JP); Nissan Motor Co., Ltd., Yokohama-shi (JP)

( * ) Notice: Subject to any disclaimer, the term of this patent is extended or adjusted under 35 U.S.C. 154(b) by 22 days.

(21) Appl. No.: 13/985,802

(22) PCT Filed: Oct. 18, 2011

(86) PCT No.: PCT/JP2011/073956
§ 371 (c)(1),
(2), (4) Date: Aug. 15, 2013

(87) PCT Pub. No.: WO2012/111192
PCT Pub. Date: Aug. 23, 2012

(65) Prior Publication Data
US 2013/0319099 A1  Dec. 5, 2013

(30) Foreign Application Priority Data
Feb. 18, 2011 (JP) ................................. 2011-033467

(51) Int. Cl.
*G01M 13/02* (2006.01)
*G01M 17/007* (2006.01)

(52) U.S. Cl.
CPC .......... *G01M 13/021* (2013.01); *G01M 13/022* (2013.01); *G01M 17/007* (2013.01)
USPC ...................................................... 73/115.02

(58) Field of Classification Search
USPC ....................................................... 73/115.02
See application file for complete search history.

(56) References Cited

U.S. PATENT DOCUMENTS

| 6,909,985 | B2* | 6/2005 | Stana ............................ 702/141 |
| 7,523,011 | B2* | 4/2009 | Akiyama et al. ............... 702/141 |
| 7,568,991 | B2* | 8/2009 | Inuta .............................. 475/120 |
| 7,715,972 | B2* | 5/2010 | Kuge ............................... 701/96 |
| 8,073,576 | B2* | 12/2011 | Matsunaga et al. ............... 701/1 |
| 8,147,379 | B2* | 4/2012 | Hyakutake ..................... 477/125 |
| 8,560,144 | B2* | 10/2013 | McGrogan ........................ 701/1 |
| 8,565,964 | B2* | 10/2013 | Tanoue et al. ................. 701/33.4 |
| 8,585,544 | B2* | 11/2013 | Honda ............................. 477/46 |
| 8,818,657 | B2* | 8/2014 | Tanaka et al. .................... 701/52 |

(Continued)

FOREIGN PATENT DOCUMENTS

| EP | 2 165 912 A1 | 3/2010 |
| JP | 01-244331 A | 9/1989 |
| JP | 09-011929 A | 1/1997 |

(Continued)

*Primary Examiner* — Freddie Kirkland, III
(74) *Attorney, Agent, or Firm* — Foley & Lardner LLP

(57) ABSTRACT

An evaluation unit includes a front-rear acceleration sensor and an up-down acceleration sensor. The evaluation unit calculates a length of a track obtained by plotting detected front-rear and up-down accelerations on a three-dimensional space along a time axis within a period from gear shift start of an automatic transmission to gear shift end, calculate a track length per unit time by dividing the length of the track by a time interval from the gear shift start to the gear shift end, and evaluates that a gear shift shock is larger as the track length per unit time is longer.

3 Claims, 5 Drawing Sheets

(56) References Cited

U.S. PATENT DOCUMENTS

| | | |
|---|---|---|
| 2004/0102918 A1 | 5/2004 | Stana |
| 2005/0023058 A1* | 2/2005 | Gebby et al. .......... 180/69.6 |
| 2007/0071327 A1 | 3/2007 | Akiyama et al. |
| 2009/0043428 A1 | 2/2009 | Matsunaga et al. |

FOREIGN PATENT DOCUMENTS

| | | |
|---|---|---|
| JP | 10-016609 A | 1/1998 |
| JP | 2004-044715 A | 2/2004 |
| JP | 2007-015432 A | 1/2007 |
| JP | 2007-093221 A | 4/2007 |

* cited by examiner

GEAR SHIFT SHOCK EVALUATION APPARATUS AND EVALUATION METHOD OF THE SAME

TECHNICAL FIELD

The present invention relates to a technique of evaluating a gear shift shock of an automatic transmission.

BACKGROUND ART

As a method for evaluating a gear shift shock of an automatic transmission, there is a method of attaching an acceleration sensor for detecting a front-rear acceleration and evaluating a magnitude of the gear shift shock based on the detected front-rear acceleration during gear shift (JP2004-44715A).

However, there is a gap between the detected front-rear acceleration and a gear shift shock felt by an evaluator (passenger). The gear shift shock cannot be accurately evaluated only from the detected front-rear acceleration.

Thus, in actual evaluation, a method in which the evaluator gives a grade in accordance with a degree of the shock felt at the time of the gear shift and further, the detected front-rear acceleration is used as a reference value for deter mining whether or not this grade is adequate is adopted.

SUMMARY OF THE INVENTION

However, with the above method, variations in the evaluation are unavoidably generated depending on evaluators. In order to reduce the variations, the evaluators may be leveled out. However, the variations can never be reduced to zero, and time and cost for leveling are generated.

An object of the present invention is to accurately evaluate a gear shift shock of an automatic transmission without relying on feel of an evaluator.

According to an aspect of the present invention, a gear shift shock evaluation apparatus of an automatic transmission mounted in a vehicle, including a front-rear acceleration detection unit adapted to detect a front-rear acceleration of the vehicle, an up-down acceleration detection unit adapted to detect an up-down acceleration of the vehicle, a track-length-per-unit-time calculation unit adapted to calculate a length of a track obtained by plotting the detected front-rear and up-down accelerations on a three-dimensional space along a time axis within a period from gear shift start of the automatic transmission to gear shift end, and calculate a track length per unit time by dividing the length of the track by a time interval from the gear shift start to the gear shift end, and a gear shift shock evaluation unit adapted to evaluate that a gear shift shock is larger as the track length per unit time is longer is provided.

According to another aspect of the present invention, a gear shift shock evaluation method of the same aspect is provided.

The track length per unit time is a parameter comprehensively expressing an acceleration change in the front and rear direction at the time of gear shift and sinkage of a front or rear part of the vehicle. Therefore, according to the above aspects, accurate evaluation close to feel of a passenger can be performed. Variations between evaluators as in the conventional evaluation method are not generated, so that uniform evaluation can be realized at low cost.

An embodiment of the present invention and advantages of the present invention will be described in detail below with reference to the attached drawings.

MODE FOR CARRYING OUT THE INVENTION

Figure 1:
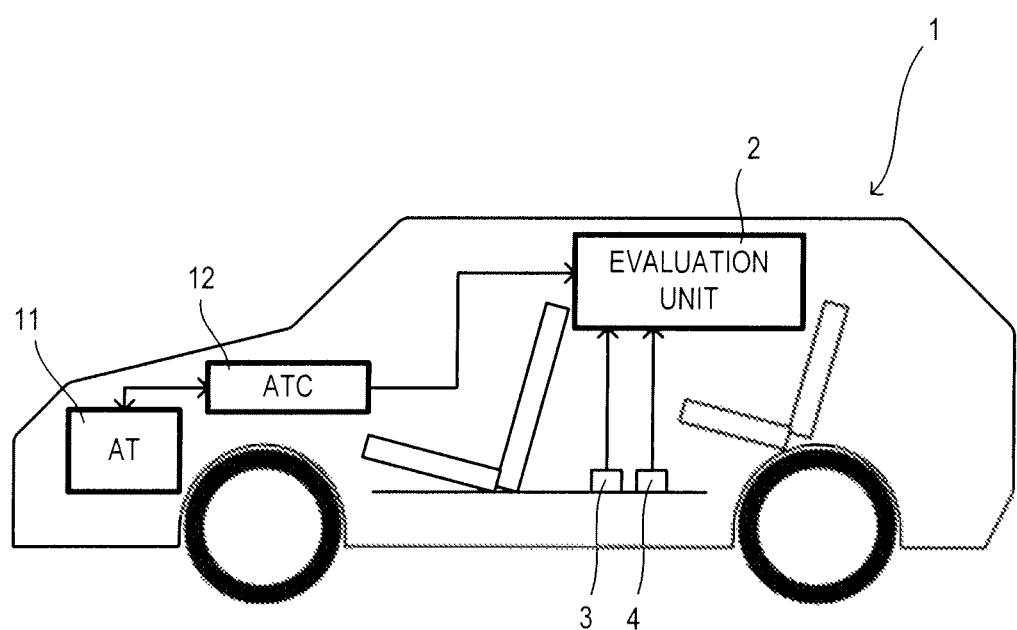
FIG. 1 is a schematic configuration diagram of a gear shift shock evaluation apparatus according to an embodiment of the present invention.

FIG. 1 shows a schematic configuration of a gear shift shock evaluation apparatus 1 according to an embodiment of the present invention. The gear shift shock evaluation apparatus 1 is mounted in a vehicle in which an automatic transmission 11 is mounted, and includes an evaluation unit 2, and a front-rear acceleration sensor 3 and an up-down acceleration sensor 4 which are electrically connected to the evaluation unit 2.

The evaluation unit 2 is a computer mountable in the vehicle such as a laptop computer or a hand-held computer. A program for having a CPU execute an evaluation procedure described later is stored in a storage device of the evaluation unit 2.

A transmission controller (ATC) 12 for controlling the automatic transmission 11 is connected to the evaluation unit 2. A vehicle speed signal, a gear shift start signal indicating that the automatic transmission 11 starts gear shift, and a gear shift end signal indicating that the gear shift of the automatic transmission 11 is ended are inputted from the transmission controller 12 to the evaluation unit 2.

The front-rear acceleration sensor 3 and the up-down acceleration sensor 4 are respectively piezoelectric type acceleration sensors attached to a floor surface of the vehicle. The front-rear acceleration sensor 3 detects a front-rear acceleration of the vehicle, and the up-down acceleration sensor 4 detects an up-down acceleration of the vehicle. Output signals of the front-rear acceleration sensor 3 and the up-down acceleration sensor 4 are inputted to the evaluation unit 2.

The evaluation unit 2 performs evaluation of a gear shift shock based on the front-rear acceleration and the up-down acceleration detected by the front-rear acceleration sensor 3 and the up-down acceleration sensor 4 at the time of the gear shift of the automatic transmission 11. An evaluation result is stored in the storage device of the evaluation unit 2 and displayed on a display of the evaluation unit 2.

Figure 2:
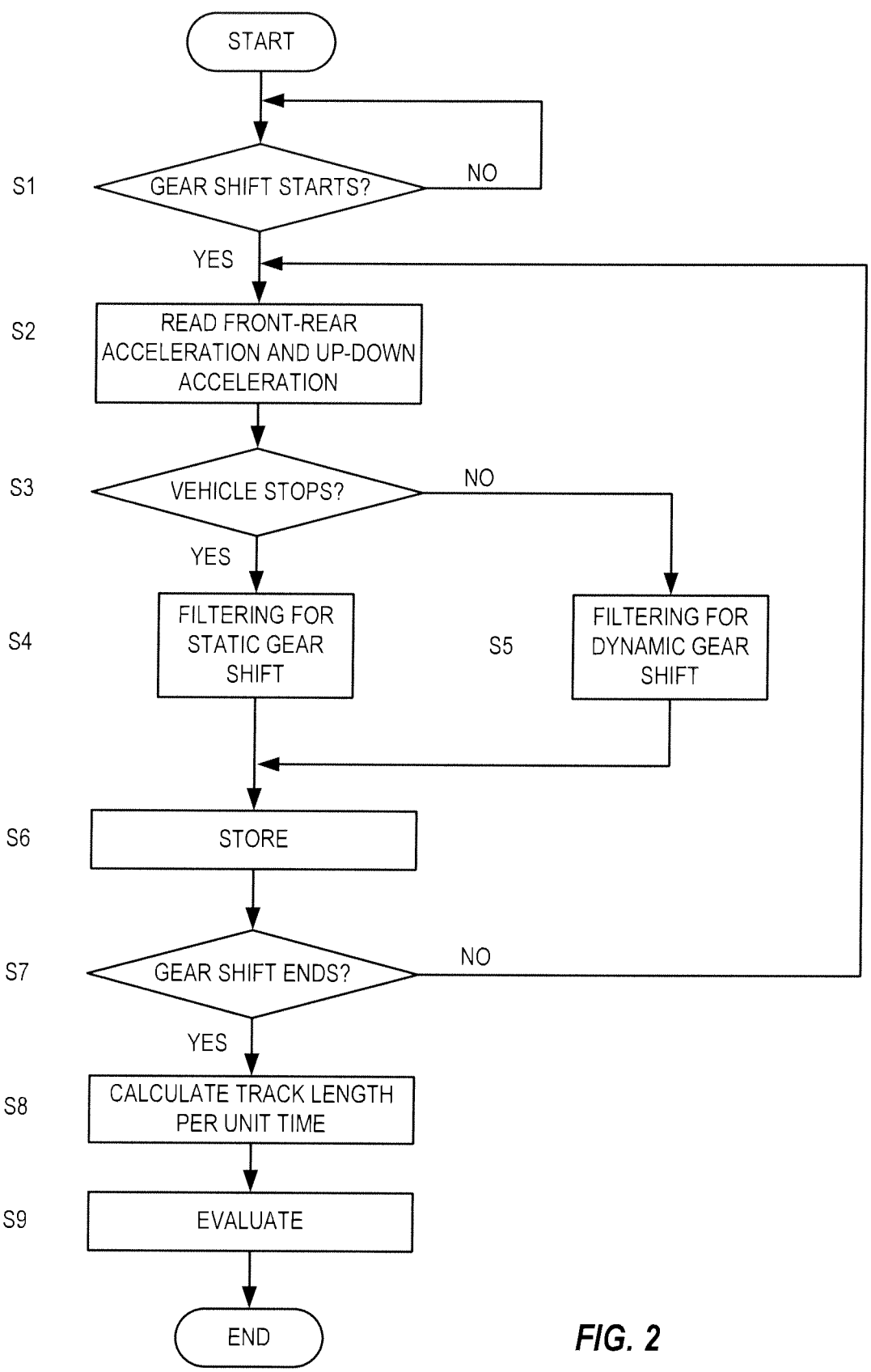
FIG. 2 is a flowchart showing a gear shift shock evaluation procedure.

Next, a detail of the evaluation procedure will be described with reference to FIG. 2. FIG. 2 shows a flow of processing of the evaluation unit 2 in a case where the evaluation unit 2 performs the evaluation of the gear shift shock of the automatic transmission 11.

Firstly, in S1, the evaluation unit 2 determines whether or not the automatic transmission 11 starts the gear shift based on whether or not the gear shift start signal is inputted from the transmission controller 12. In a case where it is determined that the gear shift start signal is inputted and the automatic transmission 11 starts the gear shift, the processing advances to S2. If not, the processing of S1 is repeated.

In S2, the evaluation unit 2 reads the front-rear acceleration and the up-down acceleration detected by the front-rear acceleration sensor 3 and the up-down acceleration sensor 4.

In S3, the evaluation unit 2 determines whether or not the vehicle is stopped based on the vehicle speed signal. In a case where the vehicle is stopped, the processing advances to S4, and in a case where the vehicle is running, the processing advances to S5. Such determination is performed because even during the same gear shift, an acceleration included in the detected acceleration and derived from other factors than the gear shift shock is differentiated depending on whether or not the vehicle is running, and hence a filter required for removing the acceleration derived from other factors than the gear shift shock is differentiated. It should be noted that in the following description, gear shift performed when the vehicle is stopped will be expressed as static gear shift, and gear shift performed when the vehicle is running will be expressed as dynamic gear shift.

Figure 3A:
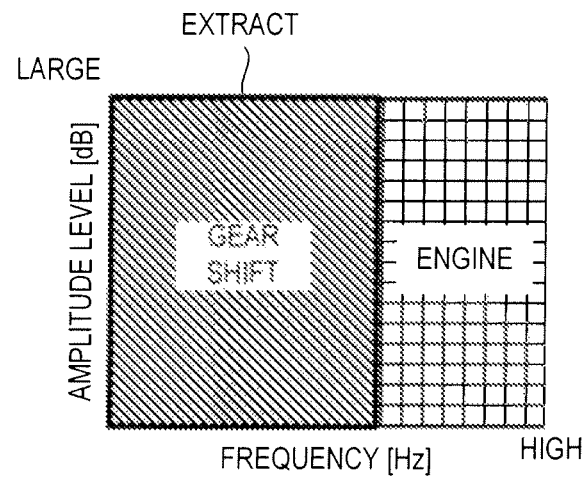
FIG. 3A is a diagram showing a filtering characteristic of a static gear shift filter.

In S4, the evaluation unit 2 applies a static gear shift filter shown in FIG. 3A to the front-rear acceleration and the up-down acceleration detected by the front-rear acceleration sensor 3 and the up-down acceleration sensor 4, removes an acceleration derived from an input from an engine from the detected front-rear and up-down accelerations, and extracts only an acceleration derived from a torque change at the time of the gear shift.

The static gear shift filter (FIG. 3A) is a low-pass filter for letting only specific frequencies or less (such as frequencies of 20 Hz or less) pass.

Figure 3B:
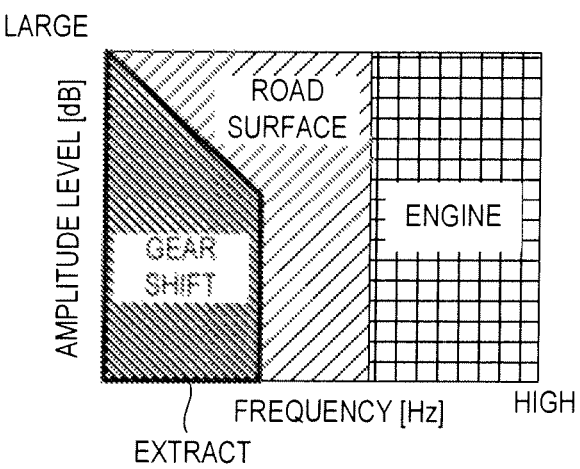
FIG. 3B is a diagram showing a filtering characteristic of a dynamic gear shift filter for front-rear acceleration.
Figure 3C:
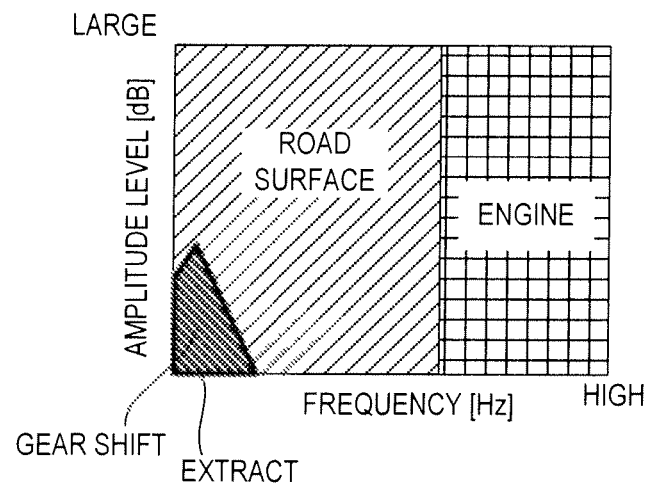
FIG. 3C is a diagram showing a filtering characteristic of a dynamic gear shift filter for up-down acceleration.

Meanwhile, in S5, the evaluation unit 2 applies a dynamic gear shift filter for front-rear acceleration shown in FIG. 3B to the front-rear acceleration detected by the front-rear acceleration sensor 3, applies a dynamic gear shift filter for up-down acceleration shown in FIG. 3C to the up-down acceleration extracted by the up-down acceleration sensor 4, removes the acceleration derived from the input from the engine and an acceleration derived from an input from a road surface from the detected front-rear and up-down accelerations, and extracts only an acceleration derived from the torque change at the time of the gear shift.

The dynamic gear shift filters (FIGS. 3B, 3C) are special filters for letting only an acceleration at a predetermined amplitude level (such as several tens of dB to −70 dB in accordance with frequencies) in a low frequency region (such as 20 Hz or less) pass.

The acceleration derived from the torque change at the time of the gear shift and extracted in such a way is a combined acceleration of the front-rear acceleration of the vehicle and the up-down acceleration derived from sinkage of a front or rear part of the vehicle which is generated at the time of the gear shift.

In S6, the evaluation unit 2 stores the front-rear acceleration and the up-down acceleration after filtering in the storage device together with an elapsed time after gear shift start.

In S7, the evaluation unit 2 determines whether or not the automatic transmission 11 ends the gear shift based on whether or not the gear shift end signal from the transmission controller 12 is inputted. In a case where it is determined that the gear shift end signal is inputted and the automatic transmission 11 ends the gear shift, the processing advances to S8. In a case where the gear shift end signal is not inputted and the automatic transmission 11 is still performing the gear shift, the processing returns to S2 and the processing of S2 to S7 are repeated.

Figure 4A:
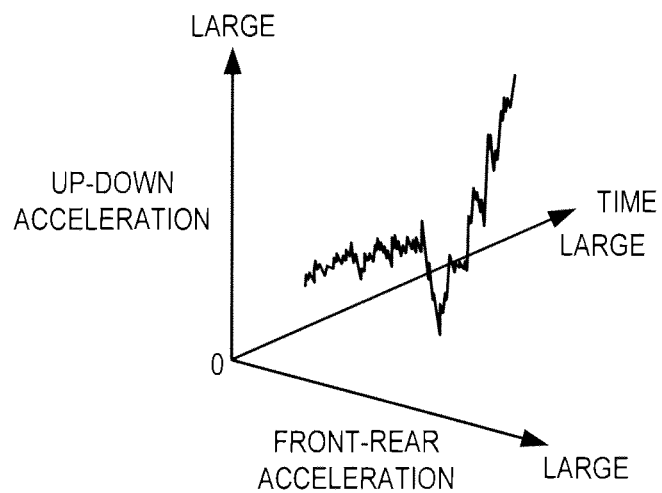
FIG. 4A is a three-dimensional graph obtained in a case where an acceleration is recorded without filtering.
Figure 4B:
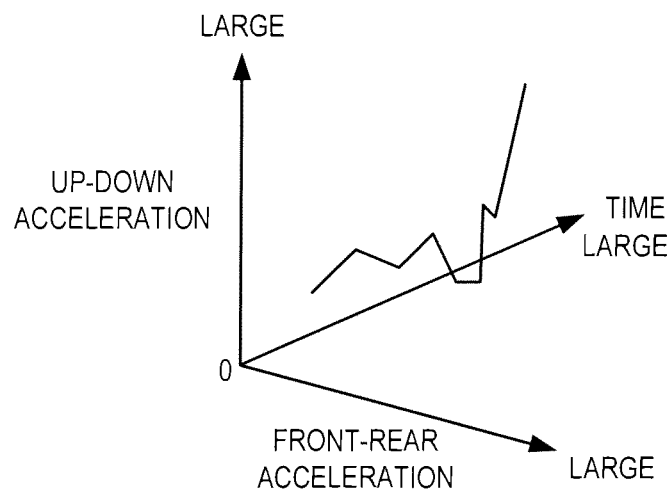
FIG. 4B is a three-dimensional graph obtained in a case where a filtered acceleration is recorded.

In S8, the evaluation unit 2 plots the front-rear acceleration and the up-down acceleration stored in the storage device after filtering on a three-dimensional space along a time axis, specifically, a space having a X axis of the front-rear acceleration, a Y axis of the up-down acceleration, and a Z axis of the elapsed time after the gear shift start. When the front-rear acceleration and the up-down acceleration before filtering are plotted, vibrating waveforms are created as in FIG. 4A. However, by plotting the front-rear acceleration and the up-down acceleration after filtering, waveforms consisting only of the acceleration derived from the gear shift shock as in FIG. 4B can be obtained.

Figure 4C:
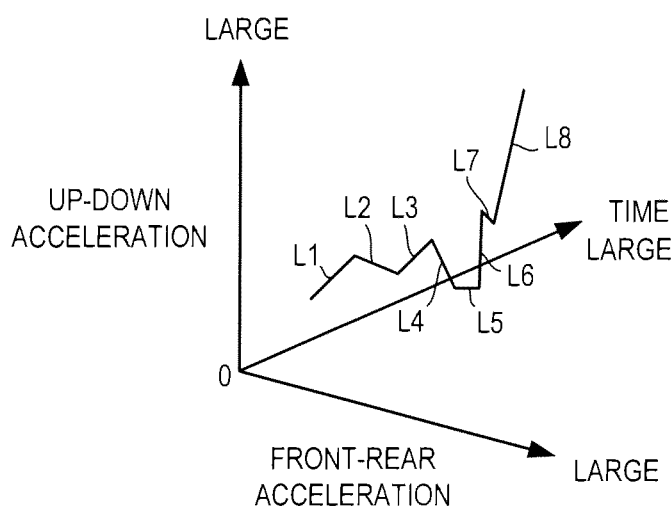
FIG. 4C is an illustrative diagram for illustrating the gear shift shock evaluation procedure according to the embodiment of the present invention.

The evaluation unit 2 calculates distances Ln between plotted points (refer to FIG. 4C) by using the Pythagorean theorem, adds up these distances, and divides the obtained addition value by a time interval T from the gear shift start to gear shift end so as to calculate a track length per unit time DL (=(L1+L2 . . . +Ln)/T).

Figure 5:
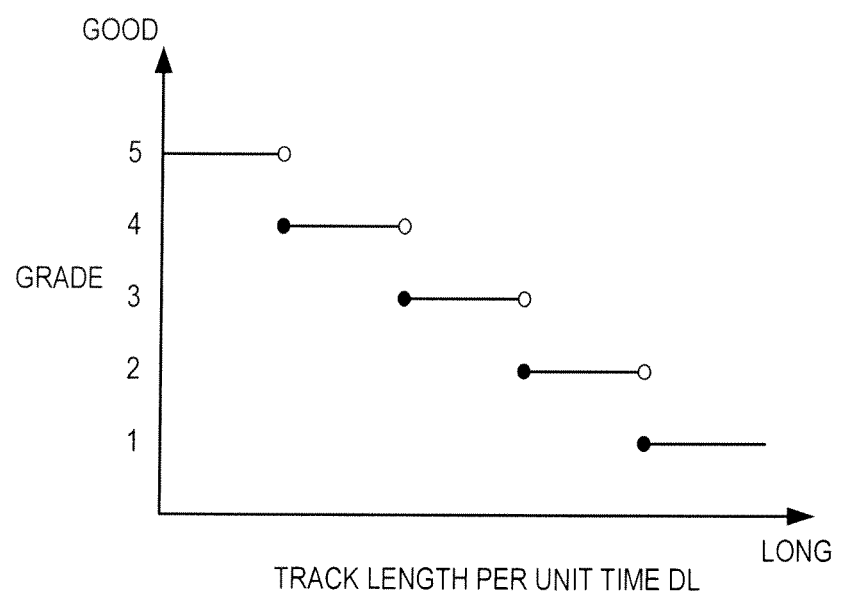
FIG. 5 is a table for calculating a grade from a track length per unit time.

In S9, the evaluation unit 2 refers to an evaluation table shown in FIG. 5, determines a grade corresponding to the track length per unit time DL, stores the grade in the storage device, and displays the grade on the display. The grade is set for example on an one-to-five point scale in such a manner that as the track length per unit time DL is longer, the grade takes a smaller value, that is, the gear shift shock is evaluated to be larger.

Next, effects of the present embodiment will be described.

In the present embodiment, the evaluation of the gear shift shock is performed based on the track length per unit time DL, and as the track length per unit time DL is longer, the gear shift shock is evaluated to be larger. The track length per unit time DL is a parameter comprehensively expressing an acceleration change in the front and rear direction at the time of the gear shift and the sinkage of the front or rear part of the vehicle. Thus, by performing the evaluation based on this, accurate evaluation close to feel of a passenger can be performed.

Since the track length per unit time DL is calculated in accordance with the preliminarily fixed calculation method and the evaluation is performed by using the preliminarily fixed evaluation table, variations between evaluators as in the conventional evaluation method are not generated, so that uniform evaluation can be realized at low cost.

Upon calculating the track length per unit time DL, the acceleration derived from the input from the engine and the acceleration derived from the input from the road surface (only the acceleration derived from the input from the engine when the vehicle is stopped) are removed. Thus, the evaluation is performed based on only the acceleration derived from the torque change at the time of the gear shift, so that highly precise evaluation is realized.

The embodiment of the present invention is described above. However, the above embodiment only shows part of application examples of the present invention, and there is no intention to specifically limit the technical scope of the present invention to the above embodiment.

For example, in the present embodiment, the front-rear acceleration and the up-down acceleration of the vehicle are respectively detected by the separately provided sensors. However, in place of these, sensors for detecting accelerations in the three-dimensional directions may be provided.

The evaluation unit 2 is mounted in the vehicle so as to perform the evaluation on the vehicle. However, the evaluation may be performed out of the vehicle by using data stored in the storage device.

Upon calculating the track length per unit time DL, the acceleration derived from the input from the engine and the acceleration derived from the input from the road surface are removed. However, with an electric automobile in which no engine is mounted, only the acceleration derived from the input from the road surface may be removed.

The method for calculating the grade from the track length per unit time DL is not limited to the above method of referring the table but the grade may be calculated based on a preliminarily set arithmetic expression.

The present application claims priority based on Japanese Patent Application No. 2011-33467 which has already been filed to the Japan Patent Office on Feb. 18, 2011, and all the contents of this application are incorporated herein by reference.

The invention claimed is:

1. A gear shift shock evaluation apparatus of an automatic transmission mounted in a vehicle, comprising:
    a front-rear acceleration detection unit adapted to detect a front-rear acceleration of the vehicle;
    an up-down acceleration detection unit adapted to detect an up-down acceleration of the vehicle;
    a track-length-per-unit-time calculation unit adapted to calculate a length of a track obtained by plotting the detected front-rear and up-down accelerations on a three-dimensional space along a time axis within a period from gear shift start of the automatic transmission to gear shift end, and calculate a track length per unit time by dividing the length of the track by a time interval from the gear shift start to the gear shift end; and
    a gear shift shock evaluation unit adapted to evaluate that a gear shift shock is larger as the track length per unit time is longer.

2. The gear shift shock evaluation apparatus according to claim 1, further comprising:
    a filtering unit adapted to remove an acceleration derived from an input from an engine and/or an acceleration derived from an input from a road surface from the detected front-rear and up-down accelerations, wherein
    the track-length-per-unit-time calculation unit is adapted to calculate a length of a track obtained by plotting values after filtering on the three-dimensional space along the time axis.

3. A gear shift shock evaluation method of an automatic transmission mounted in a vehicle, comprising:
    detecting a front-rear acceleration of the vehicle;
    detecting an up-down acceleration of the vehicle;
    calculating a length of a track obtained by plotting the detected front-rear and up-down accelerations on a three-dimensional space along a time axis within a period from gear shift start of the automatic transmission to gear shift end, and calculating a track length per unit time by dividing the length of the track by a time interval from the gear shift start to the gear shift end; and
    evaluating that a gear shift shock is larger as the track length per unit time is longer.

* * * * *